United States Patent
Keller et al.

(10) Patent No.: US 6,620,448 B2
(45) Date of Patent: Sep. 16, 2003

(54) EXTRUDER DIE WITH ADDITIVE RESERVOIR

(75) Inventors: Lewis Conrad Keller, McKinney, TX (US); Jorge C. Morales-Alvarez, Plano, TX (US); Edward Leon Ouellette, Denton, TX (US); V.N. Mohan Rao, Plano, TX (US); Vanessa Suzanne Terry, Rowlett, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 10/047,503

(22) Filed: Oct. 29, 2001

(65) Prior Publication Data

US 2003/0082257 A1 May 1, 2003

(51) Int. Cl.⁷ .............................. A23P 1/00; B29C 47/00
(52) U.S. Cl. ................. 426/512; 425/131.1; 425/382.4; 425/462; 426/249; 426/516
(58) Field of Search ................................ 426/512, 516, 426/249, 448, 449; 425/131.1, 133.1, 382.4, 462; 264/173.16, 173.18

(56) References Cited

U.S. PATENT DOCUMENTS

| 449,854 | A | 4/1891 | Herold |
|---|---|---|---|
| 2,764,995 | A | 10/1956 | Krupp et al. |
| 2,858,217 | A | 10/1958 | Benson |
| 2,858,219 | A | 10/1958 | Benson |
| 3,314,381 | A | 4/1967 | Fries et al. |
| 3,345,186 | A | 10/1967 | Kania et al. |
| 3,447,931 | A | 6/1969 | Benson et al. |
| 3,622,353 | A | 11/1971 | Sharnbrook et al. |
| 3,779,676 | A | 12/1973 | Bernard |
| 3,885,053 | A | 5/1975 | Townsend |
| 3,991,217 | A | 11/1976 | Kinney |
| 4,061,786 | A | 12/1977 | Winkler et al. |
| 4,395,217 | A | 7/1983 | Benadi |
| 4,484,877 | A | 11/1984 | Stucke et al. |
| 4,542,686 | A | 9/1985 | Bansal |
| 4,614,489 | A | 9/1986 | Juravic |

(List continued on next page.)

Primary Examiner—George C. Yeung
(74) Attorney, Agent, or Firm—Colin P. Cahoon; Carstens Yee & Cahoon LLP

(57) ABSTRACT

An extruder die assembly and method for using same is disclosed which is designed for adaptation to a wide variety of commercial-grade extrusion devices common in the food industry. The extruder die assembly is inserted into an appropriate compartment within an extrusion device such that a first extrudate is directed down a coaxially aligned passageway within the forming section and combined with a fluid additive in the injection section whereupon the resulting food mass is compressed through a converging nozzle bore in the nozzle section to produce an extruded food product. The forming section and injection section are fabricated as a matching set. The matched set, comprising the forming section and the injection section, when properly aligned and coupled form an internal peripheral reservoir manifold through which a fluid additive may be supplied to at least one and more preferably a plurality of capillary channels which in turn impart a distinct cross-sectional design into a flowing mass of a first extrudate.

19 Claims, 4 Drawing Sheets

U.S. PATENT DOCUMENTS

| | | |
|---|---|---|
| 4,626,187 A | 12/1986 | Kamada |
| 4,695,236 A | 9/1987 | Predohl et al. |
| 4,715,803 A | 12/1987 | Koppa |
| 4,835,000 A | 5/1989 | Kehoe |
| 4,900,572 A | 2/1990 | Repholz et al. |
| 4,940,593 A | 7/1990 | Duffy |
| 5,019,404 A | 5/1991 | Meisner |
| 5,066,435 A | 11/1991 | Lorenz et al. |
| 5,102,602 A | 4/1992 | Ziegler |
| 5,110,276 A * | 5/1992 | Farnsworth et al. ..... 425/131.1 |
| 5,216,946 A | 6/1993 | Huang et al. |
| 5,296,247 A | 3/1994 | Huang et al. |
| D368,791 S | 4/1996 | Laughlin |
| D372,352 S | 8/1996 | Laughlin |
| D373,671 S | 9/1996 | Laughlin et al. |
| 5,620,713 A * | 4/1997 | Rasmussen ............ 425/131.1 |
| 5,639,485 A | 6/1997 | Weinstein et al. |
| 5,643,618 A | 7/1997 | Huberg et al. |
| D384,785 S | 10/1997 | Laughlin |
| 5,686,128 A | 11/1997 | Tracy et al. |
| 5,720,987 A | 2/1998 | Ploog |
| 5,759,603 A | 6/1998 | Francisco et al. |
| 5,827,557 A | 10/1998 | Weinstein et al. |
| 5,843,503 A | 12/1998 | Clanton et al. |
| 5,955,116 A | 9/1999 | Kehoe et al. |
| 6,143,338 A | 11/2000 | Weinstein et al. |
| 6,143,339 A | 11/2000 | Weinstein et al. |
| 6,143,342 A | 11/2000 | Weinstein et al. |
| 6,251,452 B1 | 6/2001 | Weinstein et al. |

* cited by examiner

EXTRUDER DIE WITH ADDITIVE RESERVOIR

BACKGROUND OF THE INVENTION

1. Technical Field

The present invention generally relates to an apparatus and method for adding a fluid additive into an extrudable food mass, and more particularly, to an improved extruder die assembly and method for using same to impart a distinct colored and/or flavored pattern into an extrudable food mass during extrusion.

2. Description of the Related Art

The use of extrusion devices is prevalent in a number of industries, especially the food industry. Utilized to produce a variety of products such as ready-to-eat (R-T-E) cereals, snack foods and confections, extrusion remains prominent among food processes because of its versatility and efficiency.

Food processes utilizing extrusion devices typically include an edible substance such as dough which is introduced into a device and conveyed via a screw pump to an inlet where the substance is forced through an extruder die. The extruder die may perform a variety of functions: it may form or shape the extrudate; it may divide the extrudate into a multiple extrudates; it may inject an additive substance into the extrudate; and it may compress and reduce the cross-sectional area of the extrudate. Examples of devices used for extrusion of food products are illustrated in U.S. Pat. Nos. 2,858,217; 3,314,381; and 5,639,485. While extrusion dies have evolved over the years, the method by which an additive substance is supplied and injected into the extrudate has remained essentially unchanged.

For Example, in U.S. Pat. No. 2,858,217 to Benson, the introduction of coloring matter, such as a colored liquid dye, is accomplished via a series of apertures 40, 42, 44 disposed in the bridging strips 32, 34, 36 and supplied by horizontal passages 52, 54, 55 which are in fluid communication with the dye reservoir 46. The supplying of the liquid dye from the dye reservoir 46 to series of apertures 40, 42, 46 is by means of gravitational force. According to the Benson '217 device, dough material 18 is extruded through a divider block 22 which forces the dough material 18 to divide or spread around the bridging strips 32, 34, 36 so that voids 38 are formed into which the coloring matter is introduced via the series of apertures 40, 42, 44.

Similarly, in U.S. Pat. No. 3,314,381 to Fries et al., the fluid injection assembly is comprised of a hollow tubular injection member 29 in a helical spiral configuration, which includes a bore 37 through which pressurized injection fluid is supplied from a source 25 to a plurality of longitudinally spaced bores 39 into a distributing channel 38. The fluid along the length of channel 38 is injected into the passing dough as a substantially longitudinally continuous spiral band extending from substantially the central axis of the dough to either the outer face of the dough or a point short thereof. However, the Fries et al. '381 device is primarily adapted to relatively low pressure comestible extrusions.

Finally, U.S. Pat. No. 5,639,485 to Weinstein et al. and its related patents, disclose a method and apparatus for adding additives in flowing dough to make complexly patterned multicolored extrudates. The Weinstein et al. '485 invention and its progeny all disclose a high pressure extrusion device comprising an extruder die insert 20 which includes means for imparting at least one interstitial gap in the flowing dough by means of a plurality of dividing passageways (e.g., 44, 45, 46) formed by die dividing members 47. An additive (e.g., a food color or a second colored dough) may be injected via a plurality or array of evenly spaced food color injection ports 48 formed on the downstream side of die dividing member 47. The injection ports 48 are in fluid communication with a pressurized color supply 18 by means of a supply ports 52, 54, 56 and supply passageway 50. The color fluid tends to fill the interstitial gaps in the flowing dough between passageways (e.g., 44, 45, 46) formed by and behind the die dividing members 47 to create a line in the shape of dividing members 47 in the extruded dough. The die insert 20 also includes notches 57 which are used to isolate the color fluid injected into the interstitial gap from spreading to the interior surface wall of die insert 20 thereby reducing if not eliminating the leakage on color fluid onto the outside of the extruded dough. Additionally, the die insert 20 can further include a means for sealing (e.g., "O" rings 60 and 62 as depicted) the color fluid supply reservoir 58 against premature admixture with dough.

In addition to the die insert element, the Weinstein et al. '485 invention also comprises a reducing passageway 25 whereby the extrudate's cross-sectional area is significantly reduced. At high operating pressures, the convergence of the passageway 25 inherently creates a significant back pressure on the downstream side of the extruder die insert 20 which, in turn, can contribute to and promote the clogging of the individual injection ports 48. Moreover, the utilization of notches 57, sealing means 60, 62 and multiple enclosed injection ports 48 further complicates the design of the die insert making it harder to clean and maintain. Finally, injecting color fluid at discrete locations into downstream voids or interstitial gaps to disperse the fluid in a generally uniform manner requires precise control of flow rates, internal pressures, and viscosity of the extrudate and various additives. Furthermore, the design of each die insert 20 is limited to the physical constraints imposed by the previously mentioned design elements.

What is needed is an extruder die capable of operating at a variety of operating pressures which has improved seal characteristics and is simpler and easier to maintain and whose injection mechanism is less prone to clogging and blockages.

SUMMARY OF THE INVENTION

The present invention overcomes many of the shortcomings inherent in previous methods and systems addressing extruder die assemblies. The present invention comprises an improved extruder die assembly and method for using same to impart a distinct colored and/or flavored pattern into an extrudable food mass during the extrusion process.

In one embodiment, the system comprises an extruder die assembly and method for using same which includes a forming section and an injection section fabricated as a matching set. When properly aligned and coupled, the matching set forms a peripheral reservoir manifold, internal to the die assembly, through which a fluid additive may be supplied via a supply port to at least one and more preferably a plurality of capillary channels which in turn impart a distinct cross-sectional design into a flowing mass of a first extrudate.

In another embodiment, the system and method for using the present invention includes partitioning the internal peripheral reservoir manifold so that a plurality of supply ports may be used to allow different colors and/or flavors to be injected at different locations in the distinct cross-sectional design.

In another embodiment, the system and method for using same utilizes multiple matched sets of forming sections and injection sections in tandem to impart multiple pattern designs into an extrudable food mass.

In another embodiment, the system and method for using same utilizes multiple matched sets of forming sections and injection sections in tandem to impart multiple pattern designs of differing colors and/or flavors into an extrudable food mass.

In another embodiment, the system and method for using same utilizes a converging nozzle to decrease the extrudate's cross-sectional area while maintaining the distinct cross-sectional design pattern imparted into the extrudate.

Thus, in accordance with one feature of the invention, the present invention is comprised of an extruder die assembly capable of operating at a variety of operating pressures which has improved seal characteristics and is simpler and easier to maintain. Moreover, the performance of the extruder die assembly of the present invention is more stable in that surging of the fluid additive is inhibited thereby resulting in a continuous well defined pattern being injected into the extrudable food mass.

In accordance with another feature of the invention, the present invention is comprised of an extruder die assembly whose injection mechanism is less prone to clogging and blockages. The system of the present invention allows the flow of the extrudable food mass to be momentarily halted without permanently plugging the supply passageways or injection section(s).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

Figure 1A:
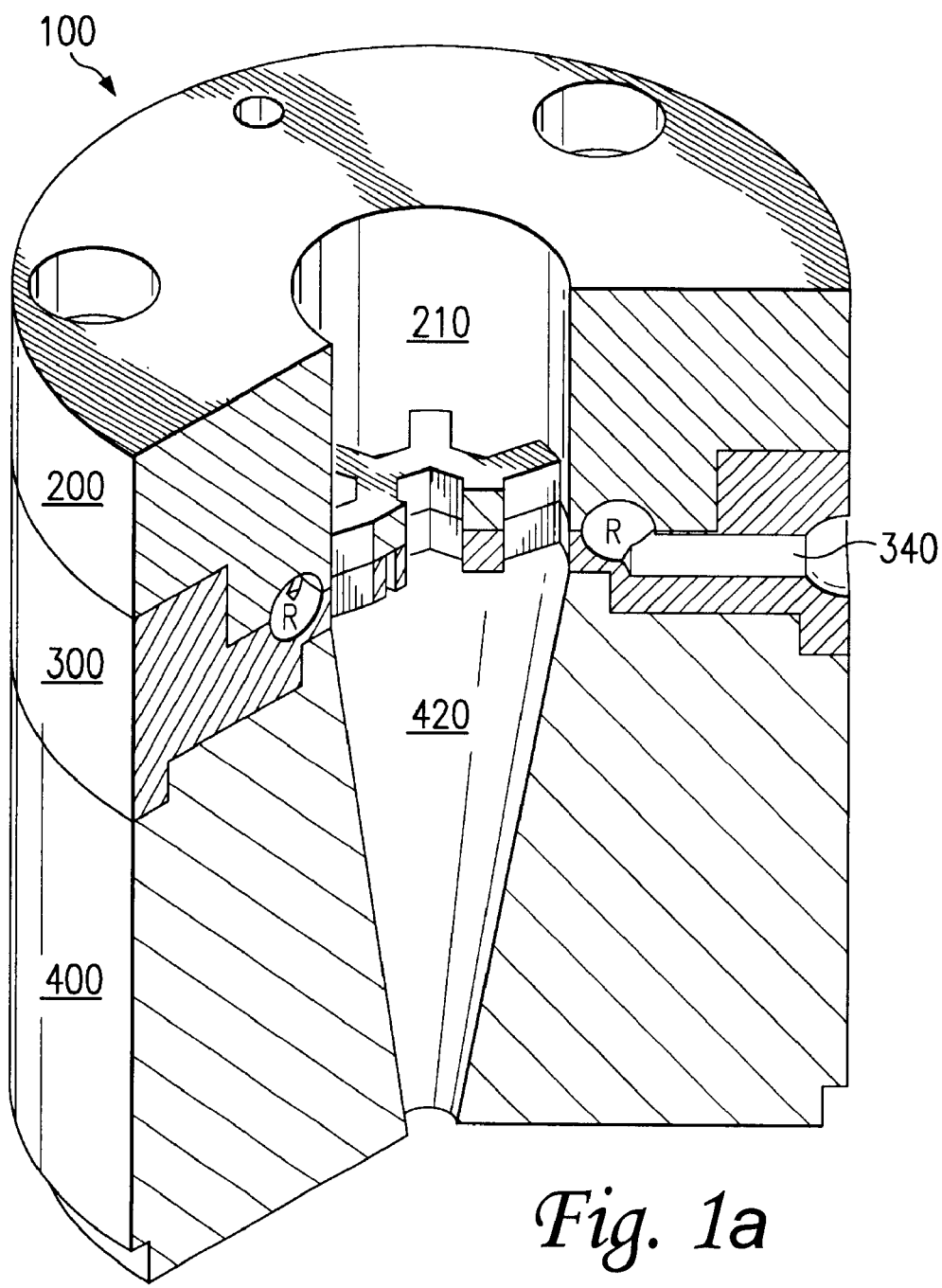
FIG. 1a is a cut-away perspective view of the extruder die assembly of the present invention.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE DRAWINGS

Figure 1B:
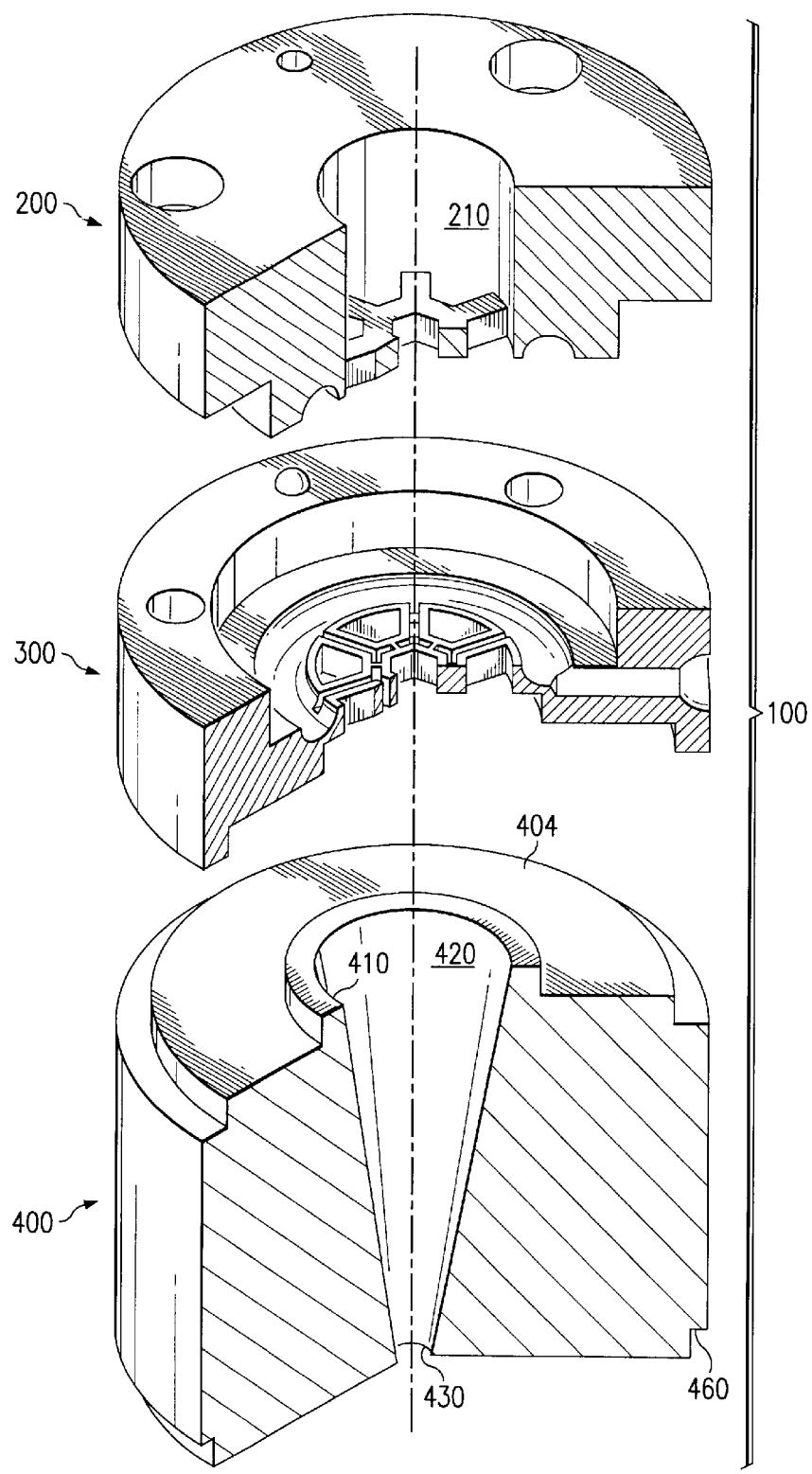
FIG. 1b is a cut-away exploded perspective view of the extruder die assembly of the present invention.

An extruder die assembly, generally indicated by reference character 100 in FIGS. 1a and 1b, includes a forming section 200, an injection section 300, and a nozzle section 400. The three sections comprising the die assembly 100 are coaxially aligned and interlocking. Additionally, means for coupling the forming section 200 to the injection section 300 are also included.

The extruder die assembly 100 is designed for adaptation to a wide variety of commercial-grade extrusion devices common in the food industry. The extruder die assembly 100 is inserted into an appropriate compartment within an extrusion device (not shown) such that a first extrudate (e.g., a paste or a cereal dough) is directed down a coaxially aligned passageway 210 within the forming section 200 and combined with a fluid additive (e.g., a food coloring dye or a flowable colored and/or flavored food material) in the injection section 300 via supply port 340 and annular reservoir R, whereupon the resulting food mass is compressed through a converging nozzle bore 420 in the nozzle section 400 to produce an extruded food product containing a distinct colored and/or flavored pattern.

While the embodiment illustrated is shown as being generally cylindrical in shape, the exterior housing of the die assembly 100 may be of any shape necessary for adaptation to commercial-grade extrusion devices common in the food industry. Similarly, while passageway 210 and bore 420 are depicted as having a circular cross sectional area, in other embodiments, passageway 210 and bore 420 can be fabricated with a more complex peripheral configuration to define or define in part the exterior shape or configuration of the finished piece, including both regular shapes (e.g., stars, rings, geometric shapes) as well as irregular shapes (e.g., animals, vegetables, objects such as trees, cars, etc.).

Figure 2A:
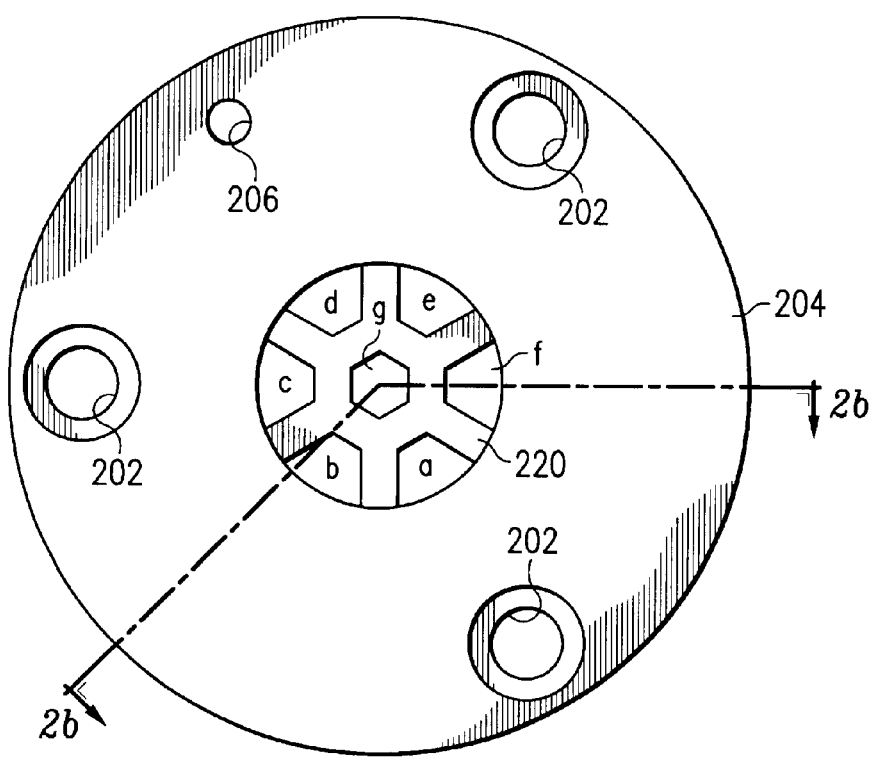
FIG. 2a is an overhead view of the forming section of the extruder die assembly of the present invention.
Figure 2B:
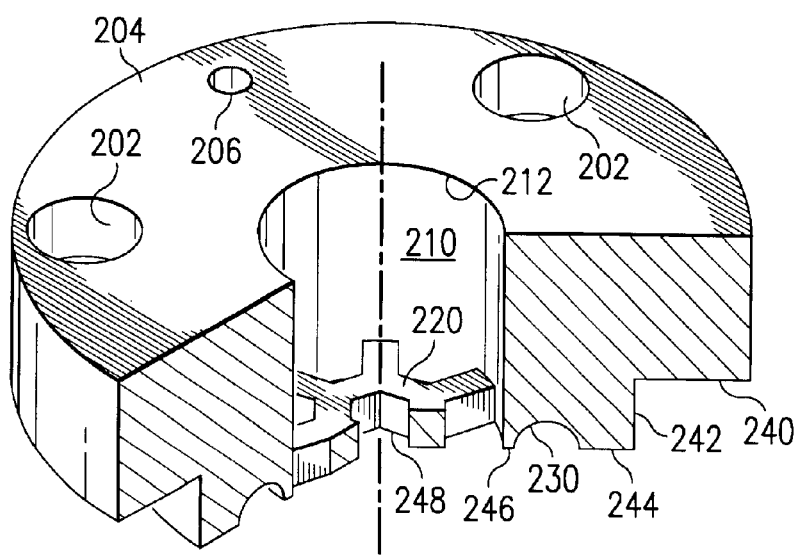
FIG. 2b is a cut-away perspective view of the forming section of the extruder die assembly of the present invention.

Referring to the figures, and in particular FIGS. 2a and 2b, the forming section 200 is a generally tubular flange element having a central bore defining a passageway 210. The inlet 212 of the passageway 210 is adapted to receive a conduit (not shown) supplying a pressurized first extrudate from an extrusion device (not shown). A plurality of counter-sunk coupling holes 202, equally spaced around the periphery of the entrance face 204 of forming section 200, are provided for receiving screws (not shown) for removably coupling the forming section 200 to threaded holes 302 in the injection section 300. An alignment hole 206 extends through the forming section 200 in parallel alignment with the passageway 210 to receive an alignment knob 306 on the entrance face 304 of the injection section 300. When properly seated into the alignment hole 206, the alignment knob 306 ensures that the axial angular alignment of the injection section 300 in relation to the forming section 200 is correct.

The outlet portion of the passageway 210 includes a forming die element 220 which divides the flow of the first extrudate into at least two, and more preferably a plurality of adjacent flowing extrudate passageways such as passageways a–g respectively formed by forming die element 220.

The forming section and injection section are fabricated as a matching set. In general, the outlet portion of the forming section is designed to mate and seal with the inlet portion of the injection section. In one embodiment, an inner peripheral rim formed in the outlet portion of the forming section is specifically designed to slidably couple and align with a central bore in the inlet portion of the injection section. The inner peripheral rim is defined by a peripheral notch formed in the outlet face of the forming section. The peripheral notch is characterized by a peripheral rim wall which is parallel with and generally equidistant from the outer periphery of the central passageway. The inner peripheral rim includes a peripheral groove with a semicircular cross-section. A matching peripheral groove with a semicircular cross-section is formed in the base of the central bore of the inlet portion of the injection section such that when the forming section and injection section are slidably coupled and aligned, an internal peripheral reservoir manifold with a circular cross-section is formed.

Figure 3A:
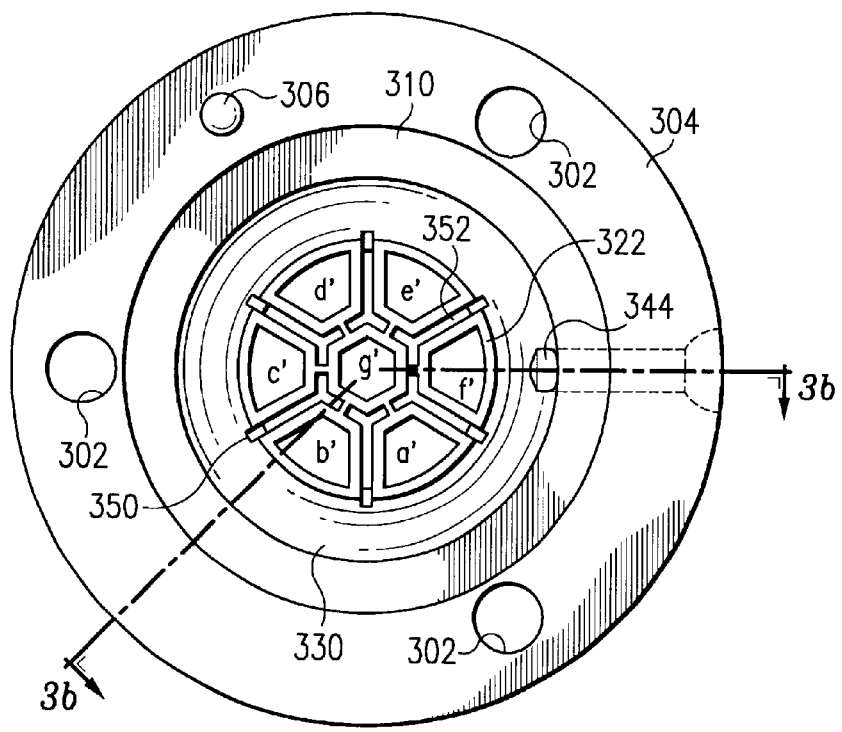
FIG. 3a is an overhead view of the injection section of the extruder die assembly of the present invention.
Figure 3B:
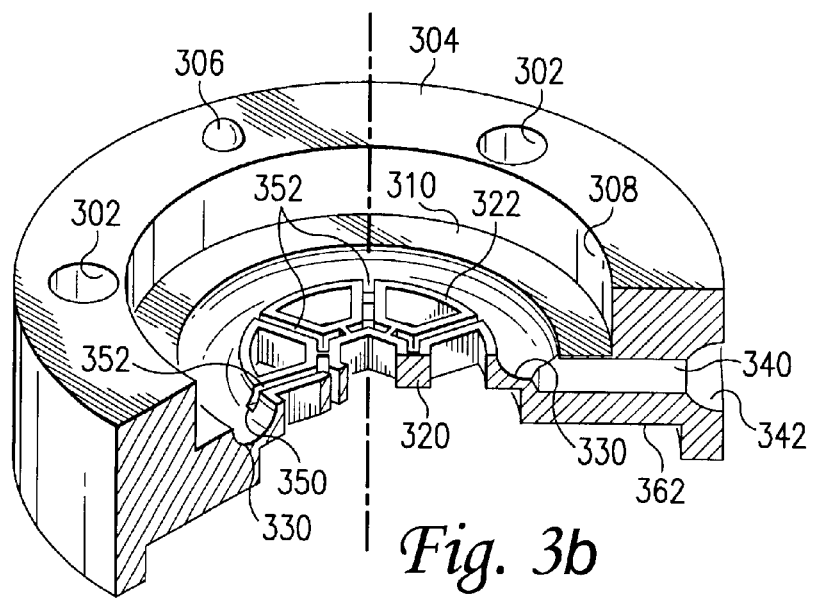
FIG. 3b is a cut-away perspective view of the injection section of the extruder die assembly of the present invention.

Thus, as shown in the figures, and in particular FIGS. 2b, 3a, and 3b, when the present invention is realized in an embodiment having a generally circular cross section, the inner peripheral rim formed in the outlet portion of the forming section 200 is an annular rim defined by an annular notch, characterized by the annular rim wall 242 and the annular outer ring seal face 240, around the outer periphery of the outlet face of the forming section 200. The annular rim in the outlet portion of the forming section 200 slidably fits into a central bore in the inlet portion of the injection section 300 defined by the annular bore wall 308 such that the forming section's annular outer ring seal face 240 seats and seals with the injection section's annular outer seal face 304, the forming section's intermediate annular seal face 244 seats and seals with the injection section's annular intermediate ring seal face 310, and the forming section's inner annular seal face 246 and the exit face 248 of the forming die element 220 seat and seal with the entrance face 322 of the injection section's co-injection die insert 320. Moreover, the matching annular peripheral grooves 230 and 330 form an annular internal peripheral reservoir manifold R into which a fluid additive may be supplied. When properly aligned and coupled, the respective annular seals between the forming section 200 and the matching injection section 300 effectively seal and isolate the fluid additive supplied to the reservoir manifold R from inadvertent leakage to the upstream side of the forming die element 220 and the outer periphery of the extruder die assembly 100.

The injection section 300 includes a co-injection die insert 320 which has profile such that when properly aligned with the forming die element 220, passageways a'–g' are respectively adjoined with passageways a–g formed by forming die element 220. When properly aligned and coupled, the seal between the exit face 248 of the forming die element 220 and the entrance face 322 of the injection section's co-injection die insert 320 ensures that the respective adjacently flowing extrudate passageways are unobstructed and contiguous and that the fluid additive contained in the reservoir manifold R does not inadvertently leak to the upstream side of the forming die element 220.

The co-injection die insert 320 includes at least one and more preferably a plurality of capillary channels 352 in the space between the plurality of passageways. The capillary channels 352 are fluidly connected to the reservoir manifold R via channel ports 350. The reservoir manifold R is fluidly connected to a pressurized source of fluid additive (not shown) via supply port 340.

When properly aligned and coupled, the seal between the exit face 248 of the forming die element 220 and the entrance face 322 of the injection section's co-injection die insert 320 ensures that the pressurized fluid additive supplied to the annular internal peripheral reservoir manifold R continually charges the capillary channels 352 via channel ports 350 whereupon each capillary channel 352 emits at its downstream exit face a continuous discharge of fluid additive in the general cross-sectional shape of the capillary channel 352 resulting in a continuous band of fluid additive being injected into the transient clefts formed in the first extrudate as it exits the adjacent flowing extrudate passageways such as passageways a'–g'. Upon exiting from the individual adjacent flowing extrudate passageways (e.g., passageways a'–g'), the individual adjacently flowing columns of first extrudate coalesce to enclose the injected bands of fluid additive within a single flow mass thereby imparting a distinct colored and/or flavored pattern into the food mass.

In an alternative embodiment of the present invention, the injection section 300 may include multiple supply ports 340 fluidly connected to separate pressurized sources of fluid additive. In such an embodiment, the annular internal peripheral reservoir manifold R may be divided into multiple segregated quadrants fluidly connecting individual pressurized sources of fluid additive to specific capillary channels 352 allowing a distinct pattern of multiple colors and/or flavors to be imparted into the food mass.

In one embodiment of the present invention, the exit face 362 of the injection section 300 is generally designed to mate and seal with the inlet face 404 of the nozzle section 400. With the exception of the co-injection die insert 320, the inlet face 404 of the nozzle section 400 is essentially a mirror image of the exit face 362 of the injection section 300. In general, the nozzle section 400 includes an inlet with a periphery matching the periphery of the forming section's passageway. The nozzle section further includes a passageway coaxially aligned with the forming section's passageway which converges to an outlet. As the passageway converges, the passageway's cross-sectional decreases while its aspect ratio is generally maintained. Thus as shown in the figures, and in particular FIGS. 1b and 3b, when the present invention is realized in an embodiment having a generally circular cross section, the nozzle section 400 includes an inlet 410 with an inner annular periphery which matches the periphery of the forming section's passageway 210. The nozzle section further includes a passageway 420 coaxially aligned with the forming section's passageway 210 which converges to an outlet 430.

In an actual embodiment having a circular cross section as illustrated in FIG. 1b, the diameter of passageway 420 is reduced from 0.664 inches at inlet 410 to 0.332 inches at outlet 430. In another such embodiment, the diameter of passageway 420 is further reduced from 0.664 inches at inlet 410 to 0.153 inches at outlet 430.

Alternatively, in another embodiment of the present invention, multiple sets of matching forming/injection sections may be adjoined in a tandem or series arrangement. In such an embodiment, the inlet face of a second set's forming section is designed to mate and seal with the exit face of a first set's injection section. Arranging multiple sets of matching forming/injection sections in tandem allows multiple pattern designs of differing colors and/or flavors to be imparted into an extrudable food mass.

It will now be evident to those skilled in the art that there has been described herein an improved extruder die apparatus and method for imparting a distinct colored and/or flavored pattern into an extrudable food mass during extrusion. Although the invention hereof has been described by way of a preferred embodiment, it will be evident that other adaptations and modifications can be employed without departing from the spirit and scope thereof. For example, multiple extrusion die assemblies may be utilized in a parallel arrangement by a single extruder device. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An extruder die assembly for imparting a distinct pattern into an extrudable food mass during extrusion, comprising:
   (a) a forming section comprising,
      (i) an entrance face having an inlet,
      (ii) a central passageway extending from the inlet to an outlet, (iii) a forming die element traversing the central passageway, and
(iv) an exit face having a first peripheral groove which circumscribes the outlet;
(b) an injection section comprising,
(i) an entrance face having a second peripheral groove circumscribing a co-injection die insert;
(1) said co-injection die insert having at least one capillary channel in fluid communication with the second peripheral groove,
(a) wherein said capillary channel includes an upstream discharge and a downstream discharge,
(ii) a supply port fluidly connecting the second peripheral groove to a fluid additive source; and
(c) means for coupling and sealing the exit face of the forming section to the entrance face of the injection section thereby positioning and aligning:
(i) the first and second peripheral grooves so as to form and isolate a peripheral reservoir manifold therebetween,
(ii) the forming die element and the co-injection die insert so as to seal the upstream discharge of the capillary channel.

2. The extruder die assembly of claim 1 further comprising in interlocking, coaxially aligned combination:
(d) a nozzle section comprising
(i) an entrance face having an inlet,
(ii) a converging passageway, and
(iii) an outlet.

3. The extruder die assembly of claim 1, wherein the first and second peripheral grooves further include a plurality of partitioning walls which when properly aligned divide the peripheral reservoir manifold into a plurality of peripheral reservoir manifold spaces, and wherein element (b)(ii) comprises a plurality of separate supply ports each fluidly connecting one of the plurality of reservoir manifold spaces in the second peripheral groove to one of a plurality of fluid additive sources.

4. The extruder die assembly of claim 2, wherein the cross sectional area of the converging passageway is reduced by a factor less than 20:1 between the inlet and the outlet of the nozzle section.

5. The extruder die assembly of claim 4, wherein the cross sectional area of the converging passageway is reduced by a factor greater than 4:1 between the inlet and the outlet of the nozzle section.

6. An extruder die assembly for imparting a distinct pattern into an extrudable food mass during extrusion, comprising, in interlocking, coaxially aligned combination:
(a) a plurality of matched sets in tandem alignment, each set comprising
(i) a forming section comprising,
(1) an entrance face having an inlet,
(2) a central passageway extending from the inlet to an outlet,
(3) a forming die element traversing the central passageway, and
(4) an exit face having a first peripheral groove which circumscribes the outlet;
(ii) an injection section comprising,
(1) an entrance face having a second peripheral groove circumscribing a co-injection die insert;
(a) said co-injection die insert having at least one capillary channel in fluid communication with the second peripheral groove,
(i) wherein said capillary channel includes an upstream discharge and a downstream discharge,
(2) a supply port fluidly connecting the second peripheral groove to a first fluid additive source; and
(iii) means for coupling and sealing the exit face of the forming section to the entrance face of the injection section thereby positioning and aligning:
(1) the first and second peripheral grooves so as to form and isolate a peripheral reservoir manifold therebetween,
(2) the forming die element and the co-injection die insert so as to seal the upstream discharge of the capillary channel.

7. The extruder die assembly of claim 6 further comprising in interlocking, coaxially aligned combination:
(b) a nozzle section comprising
(i) an entrance face having an inlet,
(ii) a converging passageway, and
(iii) an outlet.

8. The extruder die assembly of claim 7, wherein the cross sectional area of the converging passageway is reduced by a factor less than 20:1 between the inlet and outlet of the nozzle section.

9. The extruder die assembly of claim 8, wherein the cross sectional area of the converging passageway is reduced by a factor greater than 4:1 between the inlet and outlet of the nozzle section.

10. An extruder die assembly for imparting a distinct pattern into an extrudable food mass during extrusion, comprising, in combination:
(a) means for supplying a first extrudate flow wherein said means for supplying comprises means for receiving and directing the first extrudate flow down a central passageway;
(b) means for imparting at least one cleft in the first extrudate flow thereby dividing the first extrudate flow into a plurality of adjacent flowing extrudate flows,
(c) means for injecting a fluid additive into the at least one cleft between the plurality of adjacent flowing extrudate flows,
(i) wherein the injecting means comprises a co-injection die insert having at least one capillary channel in fluid communication with a peripheral reservoir manifold circumscribing the injection assembly,
(ii) wherein the injection means further comprises a supply port fluidly connecting the peripheral reservoir manifold to a fluid additive source; and
(d) means for coalescing the plurality of adjacent flowing extrudate flows into a second extrudate flow while generally maintaining the fluid additive's relative position between the plurality of adjacent flowing extrudate flows; and
(e) means for reducing the cross sectional area of the second extrudate flow.

11. The extruder die assembly of claim 10, wherein means for reducing further comprises means for reducing the cross sectional area of the second extrudate flow by a factor less than 20:1.

12. The extruder die assembly of claim 11, wherein means for reducing further comprises means for reducing the cross sectional area of the second extrudate flow by a factor of more than 4:1.

13. A method for imparting a distinct pattern into an extrudable food mass during extrusion, said method comprising, in combination, the following steps:

(a) supplying a first extrudate flow wherein said supplying step comprises receiving and directing the first extrudate flow down a central passageway,
(b) imparting at least one cleft in the first extrudate flow thereby dividing the first extrudate flow into a plurality of adjacent flowing extrudate flows
(c) injecting a fluid additive into the at least one cleft between the plurality of adjacent flowing extrudate flows
  (i) wherein the injecting step utilizes a co-injection die insert having at least one capillary channel in fluid communication with a peripheral reservoir manifold circumscribing the injection assembly,
  (ii) wherein the injection step further utilizes a supply port fluidly connecting the peripheral reservoir manifold to a fluid additive source; and
d) coalescing the plurality of adjacent flowing extrudate flows into a second extrudate flow while generally maintaining the fluid additive's relative position between the plurality of adjacent flowing extrudate flows.

14. The method of claim 13 further comprising
  e) reducing the cross sectional area of the second extrudate flow by a factor less than 20:1.

15. The method of claim 14 further comprising reducing the cross sectional area of the second extrudate flow by a factor greater than 4:1.

16. The method of claim 13, wherein the fluid additive is colored.

17. The method of claim 16, wherein the fluid additive comprises a first color and the first extrudate comprises a second color.

18. The method of claim 13, wherein the fluid additive is flavored.

19. The method of claim 18, wherein the fluid additive comprises a first flavor and the first extrudate comprises a second flavor.

* * * * *